United States Patent Office

Re. 26,441
Reissued Aug. 13, 1968

26,441

METHOD OF PRODUCING RIMMED STEEL

William D. Poole, Center Valley, Pa., assignor, by mesne assignments, to Bethlehem Steel Corporation, a corporation of Delaware No Drawing. Original No. 3,219,438, dated Nov. 23, 1965, Ser. No. 226,735, Sept. 27, 1962. Application for reissue July 11, 1966, Ser. No. 569,768
8 Claims. (Cl. 75—56)

Matter enclosed in heavy brackets [ ] appears in the original patent but forms no part of this reissue specification; matter printed in italics indicates the additions made by reissue.

This invention relates in general to a method of manufacturing rimming steels. In particular, it relates to a method of manufacturing rimming steels of the capped variety in which reactive agents are added to the molten steel in the ladle to substantially reduce the size and effect the random distribution of non-metallic inclusions in products produced therefrom.

Modern rimming steel ingots must be produced in such manner as to have good inherent surface quality and good inherent internal qualities which will result in substantially trouble-free fabrication into useful and satisfactory products.

The aforementioned steels are subjected to drastic reductions in being processed from the ingot or semi-finished form into finished steel products; as for example, finished sheet, tin and strip mill products. They may be subjected to severe deformation in subsequent drawing and/or forming operations and also to impregnation with hydrogen gas during pickling and vitreous enameling operations. For the above reasons, it is necessary for the ingot to have a good primary surface quality, i.e., have a skin of sufficient thickness and also be substantially free of non-metallic inclusions of appreciable length and breadth.

In order for the ingot to rim properly and consequently possess the required type of ingot skin, the rimming steel must have a sufficient amount of available oxygen dissolved in the molten metal when the ingot is poured. The said available oxygen is needed to sustain the optimum degree of carbon-oxygen rimming action to produce a "skin" or rim on the surfaces of the ingot. The said carbon-oxygen rimming action is of such a nature that only small or "vernier" additions to the mold of beneficial deoxidizing or other appropriate substances are required to control it.

The ingot consisting of a skin of substantially pure iron and a core, said core being substantially ferritic in nature and containing varying amounts of carbon, manganese, phosphorus, sulfur and silicon and small amounts of other residual elements normally present in such steels, produced as above, must also have internal quality sufficiently good to produce a good secondary surface, i.e., the new surface which results when the primary rimmed skin is inadequate in thickness or is locally removed as in scaling or scarfing or when new surface area is produced concurrent with reduction of section in processing. In order to accomplish the desired end result, the non-metallic inclusions, unavoidably present in all rimming steels and particularly in rimmed steels which are capped, must be small and must be well-dispersed throughout the ingot rather than segregated at the interface between the skin and core or in the ingot skin itself.

The non-metallic inclusions normally present in these steels are ordinarily of the stringer variety and are largely oxides, sulfides and silicates. These inclusions can be large, hard, and brittle, and if they form near the surface of the ingot will break through the surface of steel during subsequent hot or cold reducing operations forming "skin laminations" or localized surface imperfections resulting in an unsatisfactory product. Due to the deformations involved in subsequent drawing or other cold forming operations the said inclusions can also result in localized failures during deformation or break through the surface of the steel resulting in unusable or inferior products. The aforementioned inclusions may also become focal points into which nascent hydrogen can penetrate during acid pickling and vitreous enameling operations. Molecular hydrogen will not diffuse through cold solidified metal. Therefore, the accumulation of the molecular hydrogen or the increase in its volume and its attendant greater pressure, especially when the article is heated rapidly, becomes great enough to form blisters in the sheet rendering the article unsatisfactory for use.

It is the primary object of this invention to produce a rimming type steel which has smaller and more widely dispersed non-metallic inclusions than heretofore obtainable.

It is another object of this invention to produce an ingot of rimming type steel having good inherent primary surface quality and superior internal quality by the addition of an oxidizing agent and a deoxidizing agent to the molten steel while it is in the ladle.

It is another object of this invention to produce an ingot of rimming type steel which can be processed into useful and salable products with a minimum amount of various internal and surface imperfections attributable to "dirty" steel.

It is still another object of this invention to produce an ingot of rimming and/or capped type steel which may be processed into double reduced tinplate with a minimum amount of rejections due to surface blemishes or internal imperfections resulting from non-metallic inclusions in the steel.

It is another object of this invention to produce an ingot of rimming type steel which can be formed into useful products by rolling, drawing and pickling and enameling operations with a minimum amount of rejections.

It is another object of this invention to produce a rimming steel which when processed into useful articles by welding, will produce a weld which is more reliably stronger and sounder than heretofore produced from such steels.

I have found that by adding an oxidizing agent to a rimming steel during the tapping of the molten metal into the ladle the amount of dissolved oxygen in the steel is increased. By adding an amount of a suitable deoxidizing agent in the ladle to react with the excess oxygen, the formation of large globules and stringer type non-metallic inclusions is inhibited. The steels treated by my process are characterized by the presence of smaller, better dispersed non-metallic inclusions and by a diminution in severity of the stringer-type inclusions usually associated with rimming steels. By "small" inclusions is meant those inclusions present in the steels treated according to the present invention, substantially all of which are smaller than those normally observed in rimmed steels. As a result, it is possible to produce an ingot which may be processed into finished steel products with a negligible amount of rejections due to skin laminations or surface blemishes or other injurious imperfections developing in processing operations and subsequent forming or drawing operations; including the formation of blisters during pickling and vitreous enameling operations and to the incidence of weak spots in welds associated with inclusions of significant size.

My preferred method of manufacturing a rimming type steel comprises adding iron oxide (for example, mill scale) in the ladle to the molten metal as it is being tapped from the furnace. The said iron oxide is added in a dry finely divided state. Beneficial results have been obtained when using amounts of the said oxidizing agent ranging from about 0.05 pound up to about 4.0 pounds per ton of molten metal. In conjunction with the added iron oxide, aluiminum is also added to the molten metal in the ladle. It has been found that the maximum amount of aluminum to be added at this time is the amount of aluminum that will combine with substantially all of the added oxygen effectively introduced into the steel. This achieves the beneficial results of the invention, i.e. forming small non-metallic inclusions rather than large globular and stringer types often heretofore obtained. These beneficial results, however, can also be achieved by adding aluminum in amounts somewhat less than sufficient to react with substantially all of the added oxygen effectively introduced in the steel. For example, additions of up to 2.0 pounds of aluminum per ton of steel can be added to the molten metal in the ladle with beneficial results.

Thereafter standard practices for making rimmed or capped steel are followed. Further aluminum additions may be made in the ladle or the mold to control rimming action, but not in amounts sufficient to result in a killed steel.

The molten metal is then teemed into [ingot] molds and the rimming action controlled by appropriate additions made to the mold. Although it is not essential to the present invention, aluminum may be added in the mold to control the rimming action. This latter addition has been found to aid in the achievement of the final result.

The above process results in an ingot having small and finely divided well-dispersed non-metallic inclusions well under the skin of the ingot instead of large globules and stringer type non-metallic inclusions normally found in steels of this type. Ingots possessing this type of non-metallic inclusions have been rolled, welded, deep-drawn and pickled and vitreous enameled with a minimum amount of difficulty and rejections due to skin laminations, surface blemishes and blisters, or other difficulties associated with larger size non-metallic inclusions, and particularly when at or near the surface.

A specific example of the present invention involved the manufacture of an 0.08% maximum carbon, .25/.40% manganese mechanically capped rimmig steel. The heat was melted in the manner usual for rimming steels and tapped. During tapping, about 1.2 pounds per ton of very finely divided, dry, mill scale (i.e. iron oxide) was added to the ladle. This was done after a cushion of about 18 inches to 24 inches of steel had been tapped into the ladle. Immediately after the addition of the mill scale, about 0.15 pound per ton of shot aluminum was added to the molten metal in the ladle. The shot luminum combined with a portion of the oxygen, i.e., oxygen which is normally present in the steel plus the additional oxygen made available by the mill scale addition, dissolved in the molten bath. The resultant reaction formed small non-metallic inclusions, complex $FeO:Al_2O_3$ and $Al_2O_3$, which were widely dispersed throughout the bath. The amount of aluminum added was sufficient to combine with substantially all of the effectively introduced added oxygen, but there remained in the steel an amount of oxygen equal to that normally found in the steel plus a portion of the excess amount which had been deliberately added. After the heat was tapped 0.19 pound of aluminum per ton of steel was added to the ladle to react with a portion of the remaining dissolved oxygen. In order to bring the heat to the required manganese content, 9.9 pounds of ferromanganese per ton of steel was added to the ladle. The heat was teemed into ingot molds, with about 15 ounces of aluminum being added to each mold to control the rimming action. The sheet steel produced from this heat was used for various applications, a portion being processed into double reduced tinplate, a portion was applied on orders for hot rolled sheet subsequently processed into auto wheel rims, and a portion was applied on orders for cold rolled sheets.

In the processes of making prior art rimming steels of the capped variety, the rimming action begins as in a regular rimmed steel but is terminated after a short rimming period by sealing the mold with a steel or cast-iron cap or by chemical means. The product of this standard procedure is an ingot having a thin rimmed skin and large non-metallic globular and stringer type inclusions trapped in the ingot by the capping procedure. As a result, these steels usually appear "dirtier" than regular rimmed steels.

The steels treated in accordance with the present invention are capped in the usual manner. But because of the inhibition of the formation of larger non-metallic inclusions, the above steels appear "cleaner" when viewed at 100 magnifications (normally used in metallographic study) than do the capped steels made in the usual manner. The inclusions formed in my process are finer and more widely dispersed, and fewer of them are discernible at such magnification.

I have described the preferred method of the present invention above, but the order of the ladle additions cited may be altered or even reversed. For example, aluminum may be added to the molten metal in the ladle either prior to, during, or after the addition of the oxidizing agent employed.

I claim:

1. A method of manufacturing a rimming type steel comprising:
   (a) melting a heat of steel and tapping the molten metal into a ladle,
   (b) adding to the molten metal in the ladle a solid oxidizing agent,
   (c) adding to the molten metal in the ladle aluminum in an amount no more than sufficient to combine with substantially all of the oxygen in said oxidizing agent,
   (d) and teeming the treated metal into [ingot] molds.

2. A method as claimed in claim 1 with the said oxidizing agent of step (b) being mill scale.

3. A method as claimed in claim 1, said oxidizing agent of step (b) being mill scale added in the range of about 0.05 pound up to about 4.0 pounds per ton and the aluminum of step (c) being added in an amount up to about 2.0 pounds per ton.

4. A method as claimed in claim 1, said oxidizing agent of step (b) being mill scale added in the range of 1.0 pound up to about 2.0 pounds per ton of steel and the aluminum of step (c) being added in the range of 0.05 pound up to about 0.5 pound per ton of steel.

5. A method of manufacturing a rimming type steel comprising:
   (a) melting a heat of steel and tapping the molten metal into a ladle,
   (b) adding to the molten metal in the ladle a solid oxidizing agent,
   (c) adding to the molten metal in the ladle aluminum in an amount no more than sufficient to combine with substantially all of the oxygen in said oxidizing agent,
   (d) teeming the treated metal into ingot molds,
   (e) and capping the ingots.

6. A method as claimed in claim 5 with the said oxidizing agent of step (b) being mill scale.

7. A method as claimed in claim 5, said oxidizing agent of step (b) being mill scale added in the range of from about 0.05 pound up to about 4.0 pounds and the aluminum of step (c) being added in an amount up to about 2.0 pounds per ton.

8. A method as claimed in claim 5, said oxidizing agent of step (b) being mill scale added in the range of from about 1.0 pound up to about 2.0 pounds per ton of steel and the aluminum of step (c) being added in the range of from 0.05 pound up to about 0.5 pound per ton of steel.

References Cited

The following references, cited by the Examiner, are of record in the patented file of this patent or the original patent.

UNITED STATES PATENTS

| | | | |
|---|---|---|---|
| 2,025,425 | 12/1935 | Smith | 75—56 |
| 2,333,741 | 12/1943 | Reeder | 75—53 |
| 2,705,673 | 4/1955 | Jordan | 75—58 |
| 2,850,373 | 9/1958 | Boucek | 75—53 |
| 2,854,329 | 9/1958 | Rossborough | 75—53 |

BENJAMIN HENKIN, *Primary Examiner.*